(12) United States Patent
Griffith et al.

(10) Patent No.: US 9,692,512 B2
(45) Date of Patent: Jun. 27, 2017

(54) DIRECTIONAL MULTIBAND ANTENNA

(71) Applicant: BAE SYSTEMS plc, London (GB)

(72) Inventors: Michael Stewart Griffith, Chelmsford (GB); Leslie Charles Laycock, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/775,097

(22) PCT Filed: Mar. 4, 2014

(86) PCT No.: PCT/GB2014/050628
§ 371 (c)(1),
(2) Date: Sep. 11, 2015

(87) PCT Pub. No.: WO2014/140528
PCT Pub. Date: Sep. 18, 2014

(65) Prior Publication Data
US 2016/0036529 A1    Feb. 4, 2016

(30) Foreign Application Priority Data

Mar. 15, 2013  (EP) .................................. 13275067
Mar. 15, 2013  (GB) .................................. 1304720.4

(51) Int. Cl.
*H04B 10/00*       (2013.01)
*H04B 10/2575*     (2013.01)
(Continued)

(52) U.S. Cl.
CPC .......... *H04B 10/2575* (2013.01); *G02B 6/32* (2013.01); *H01Q 3/30* (2013.01); *H01Q 5/22* (2015.01); *H01Q 5/42* (2015.01); *H01Q 21/061* (2013.01)

(58) Field of Classification Search
USPC ................................................. 398/118–131
See application file for complete search history.

(56) References Cited

U.S. PATENT DOCUMENTS 3,305,867 A * 2/1967 Miccioli .................. H01Q 3/46
                                                    333/24.1
3,878,520 A * 4/1975 Wright ................. H01Q 3/2676
                                                    342/368
(Continued)

FOREIGN PATENT DOCUMENTS

WO     2012010874 A1    1/2012
WO     2014140528 A1    9/2014

OTHER PUBLICATIONS

International Preliminary Report on Patentability received for Patent Application No. PCT/GB2014/050628, mailed on Sep. 24, 2015. 8 pages.

(Continued)

*Primary Examiner* — Agustin Bello
(74) *Attorney, Agent, or Firm* — Finch & Maloney PLLC (57) ABSTRACT

There is disclosed a directional multi-band antenna comprising a substrate structure, a plurality of RF units arranged at the substrate structure to provide an RF phased array, the RF phased array having an angular scan range, an array of optical units arranged at the substrate structure and interspersed amongst the RF units, an array of optical lensing devices supported over the substrate structure, the array of optical lensing devices being substantially RF transmissive and being arranged to correspond with the arrangement of the optical units, such that each optical unit may communicate light signals with an associated optical lensing device so as to communicate light signals along an optical axis within the angular scan range of the RF phased array.

18 Claims, 4 Drawing Sheets

(51) Int. Cl.
*H01Q 21/06* (2006.01)
*H01Q 5/22* (2015.01)
*H01Q 5/42* (2015.01)
*G02B 6/32* (2006.01)
*H01Q 3/30* (2006.01)

(56) References Cited

U.S. PATENT DOCUMENTS

| | | | |
|---|---|---|---|
| 4,157,544 A | 6/1979 | Nichols | |
| 4,477,814 A * | 10/1984 | Brumbaugh | H01Q 21/20 342/53 |
| 4,736,463 A * | 4/1988 | Chavez | H01Q 3/34 342/367 |
| 4,791,427 A | 12/1988 | Raber et al. | |
| 4,864,310 A * | 9/1989 | Bernard | H04J 14/00 342/368 |
| 5,093,747 A * | 3/1992 | Dorschner | G02F 1/292 359/315 |
| 5,173,711 A * | 12/1992 | Takeuchi | H01Q 9/0421 343/700 MS |
| 5,268,680 A * | 12/1993 | Zantos | F41G 7/008 342/53 |
| 5,305,009 A * | 4/1994 | Goutzoulis | H01Q 3/38 342/157 |
| 5,327,149 A | 7/1994 | Kuffer | |
| 5,436,453 A * | 7/1995 | Chang | H01Q 21/28 250/332 |
| 5,451,969 A * | 9/1995 | Toth | H01Q 19/19 343/700 MS |
| 5,751,242 A * | 5/1998 | Goutzoulis | G01S 7/032 342/157 |
| 5,861,845 A * | 1/1999 | Lee | H01Q 25/008 342/374 |
| 6,020,850 A * | 2/2000 | Ji | H01Q 3/2676 342/368 |
| 6,204,947 B1 * | 3/2001 | Page | H01Q 3/2676 250/227.12 |
| 6,393,177 B2 * | 5/2002 | Paek | H01Q 3/2676 343/720 |
| 6,417,807 B1 * | 7/2002 | Hsu | H01Q 1/38 333/262 |
| 6,424,756 B1 * | 7/2002 | Kalman | G02B 6/3594 385/16 |
| 6,426,721 B1 * | 7/2002 | Obara | H01Q 3/2676 342/372 |
| 6,445,496 B1 * | 9/2002 | Presby | H04B 10/1121 359/366 |
| 6,469,822 B1 * | 10/2002 | Zhu | G02F 1/292 349/202 |
| 6,495,813 B1 * | 12/2002 | Fan | H01L 27/14603 250/208.1 |
| 6,760,512 B2 * | 7/2004 | Pepper | G02F 1/011 385/15 |
| 6,807,343 B2 * | 10/2004 | Tulchinsky | H01Q 3/2676 385/140 |
| 6,810,164 B2 * | 10/2004 | Dorschner | G02F 1/29 349/159 |
| 6,828,935 B1 * | 12/2004 | Dunn | G01S 19/21 342/357.29 |
| 6,844,848 B2 * | 1/2005 | Stephens | H04J 14/02 342/368 |
| 7,053,853 B2 * | 5/2006 | Merenda | H01Q 21/065 343/820 |
| 7,084,811 B1 * | 8/2006 | Yap | H01Q 3/2676 342/373 |
| 7,358,497 B1 * | 4/2008 | Boreman | H01Q 5/42 250/332 |
| 7,619,562 B2 * | 11/2009 | Stumbo | H01Q 3/34 342/372 |
| 7,696,943 B2 * | 4/2010 | Chiang | H01Q 25/002 343/757 |
| 7,729,572 B1 * | 6/2010 | Pepper | G02B 6/12004 342/375 |
| 7,898,464 B1 * | 3/2011 | Anderson | H01Q 3/2676 342/175 |
| 7,957,648 B2 * | 6/2011 | Hillis | B82Y 20/00 398/115 |
| 8,094,081 B1 * | 1/2012 | Bruzzi | H01Q 13/0208 343/725 |
| 8,229,304 B1 * | 7/2012 | Pepper | H04B 10/61 398/162 |
| 8,248,298 B2 * | 8/2012 | Lalezari | H01Q 21/08 342/120 |
| 8,305,259 B2 * | 11/2012 | Margomenos | G01S 7/032 342/118 |
| 8,338,772 B2 * | 12/2012 | Kotter | H01Q 1/248 250/208.2 |
| 8,400,355 B1 * | 3/2013 | Gaeta | H01Q 3/2682 342/368 |
| 8,427,370 B2 * | 4/2013 | Pozgay | H01Q 3/26 342/372 |
| 8,446,318 B2 * | 5/2013 | Ali | H01Q 1/1257 342/374 |
| 8,466,848 B2 * | 6/2013 | Guy | H01Q 3/2676 343/853 |
| 8,559,823 B2 * | 10/2013 | Izadpanah | G01S 7/282 398/115 |
| 8,570,237 B2 * | 10/2013 | Brown | H01Q 21/0025 343/876 |
| 8,687,073 B2 * | 4/2014 | van Hoorebeke | G02B 3/0068 348/218.1 |
| 8,737,838 B2 * | 5/2014 | Adlerstein | H01Q 3/2676 398/115 |
| 8,811,511 B2 * | 8/2014 | Sayeed | H01Q 15/0006 343/755 |
| 8,847,824 B2 * | 9/2014 | Kotter | H01Q 1/248 343/700 MS |
| 8,934,774 B2 * | 1/2015 | Yi | H01Q 3/2676 398/103 |
| 8,963,789 B2 * | 2/2015 | Chang | H04B 10/112 343/754 |
| 9,190,724 B2 * | 11/2015 | Turbiner | H01Q 3/26 |
| 9,413,078 B2 * | 8/2016 | Leiba | H01Q 19/062 |
| 2002/0181874 A1 * | 12/2002 | Tulchinsky | H01Q 3/2676 385/39 |
| 2003/0030594 A1 * | 2/2003 | Larry | H01Q 11/08 343/895 |
| 2004/0062469 A1 * | 4/2004 | Ionov | H04B 10/11 385/15 |
| 2004/0090365 A1 * | 5/2004 | Newberg | H01Q 3/22 342/368 |
| 2004/0151422 A1 * | 8/2004 | Shah | G02F 1/332 385/17 |
| 2004/0156641 A1 * | 8/2004 | Dorschner | G02F 1/29 398/188 |
| 2005/0141814 A1 * | 6/2005 | Efimov | G02B 6/2861 385/39 |
| 2005/0161662 A1 * | 7/2005 | Majumdar | B82Y 10/00 257/18 |
| 2005/0201429 A1 * | 9/2005 | Rice | B23K 26/0604 372/27 |
| 2006/0033663 A1 * | 2/2006 | Saint Clair | H01Q 1/22 343/700 MS |
| 2007/0176824 A1 * | 8/2007 | Stumbo | H01Q 3/34 342/372 |
| 2008/0031627 A1 * | 2/2008 | Smith | G02B 6/2931 398/83 |
| 2009/0027268 A1 * | 1/2009 | Coward | H01Q 3/2676 342/375 |
| 2009/0028573 A1 * | 1/2009 | Krill | H04B 10/118 398/125 |
| 2009/0201575 A1 * | 8/2009 | Fermann | H01S 3/10084 359/341.32 |
| 2010/0309089 A1 * | 12/2010 | Collinson | H01Q 1/42 343/872 |
| 2011/0158645 A1 * | 6/2011 | Egorov | G02B 5/008 398/48 |

(56) References Cited

U.S. PATENT DOCUMENTS

| | | | | |
|---|---|---|---|---|
| 2012/0002973 | A1* | 1/2012 | Bruzzi | H01Q 13/0208 398/116 |
| 2012/0140780 | A1* | 6/2012 | Chang | H04B 7/0413 370/479 |
| 2012/0206794 | A1* | 8/2012 | Fermann | H01S 3/10084 359/341.3 |
| 2012/0328298 | A1* | 12/2012 | Yi | H01Q 3/2676 398/96 |
| 2013/0202297 | A1* | 8/2013 | Martinelli | G02B 6/3512 398/49 |
| 2014/0036350 | A1* | 2/2014 | Fermann | H01S 3/10084 359/341.3 |
| 2014/0193158 | A1* | 7/2014 | Ruggiero | G02B 17/0856 398/115 |
| 2014/0355985 | A1* | 12/2014 | Chu | G02F 1/292 398/49 |
| 2014/0363170 | A1* | 12/2014 | Koonen | H04B 10/1149 398/115 |
| 2014/0376001 | A1* | 12/2014 | Swanson | A61B 5/0066 356/479 |
| 2015/0002804 | A1* | 1/2015 | Khan | G02F 1/292 349/202 |
| 2015/0080039 | A1* | 3/2015 | Ling | H04W 52/02 455/500 |
| 2015/0207289 | A1* | 7/2015 | Fermann | H01S 3/10084 359/341.33 |
| 2015/0288442 | A1* | 10/2015 | Chang | H04B 7/0413 370/316 |
| 2016/0006516 | A1* | 1/2016 | Schuetz | H04B 10/25759 398/115 |
| 2016/0036529 | A1* | 2/2016 | Griffith | H01Q 21/061 398/116 |
| 2016/0127073 | A1* | 5/2016 | Ashrafi | H04J 14/00 398/44 |
| 2016/0139266 | A1* | 5/2016 | Montoya | G01S 17/32 356/5.01 |
| 2016/0211578 | A1* | 7/2016 | Ghelfi | H01Q 3/2676 |
| 2016/0226209 | A1* | 8/2016 | Fermann | H01S 3/10084 |

OTHER PUBLICATIONS

International Search Report and Written Opinion received for Patent Application No. PCT/GB2014/050628, mailed on May 15, 2014. 10 pages.

GB Intellectual Property Office Search Report under Section 17(5) received for GB Patent Application No. 1304720.4 mailed Aug. 5, 2013. 4 pages.

Extended European Search Report received for EP Patent Application No. 13275067.0 mailed Jul. 8, 2013. 6 pages.

* cited by examiner

DIRECTIONAL MULTIBAND ANTENNA

The present invention relates to a directional multi-band antenna.

It is known from for example U.S. Pat. No. 8,094,081 to provide a dual-band antenna which may transmit or receive a beam of electromagnetic radiation, at two distinct frequency/wavelength bands, to or from a further source. In U.S. Pat. No. 8,094,081 the first band of electromagnetic radiation is in the visible to near infra-red spectrum (400-1500 nm), and the second band of electromagnetic radiation is in the radio frequency spectrum.

Such a device transmitting or receiving different wavelength/frequency beams along the same bore sight may alternatively be referred to as a 'common aperture' antenna.

Further, it is known from 'Large-scale nanophotonic phased array' published in Nature 493, 195-199, to provide an optical phased array having a 64×64 array of nanophotonic elements. Each element is configured to select, independently from other elements, the amplitude and phase of the optical signal it emits. The elements have a pitch of 9 microns therebetween and accordingly each array has dimensions of 0.58 mm×0.58 mm.

According to the present invention there is provided a directional multi-band antenna comprising a substrate structure, a plurality of RF units arranged at the substrate structure to provide an RF phased array, the RF phased array having an angular scan range, an array of optical units arranged at the substrate structure and interspersed amongst the RF units, an array of optical lensing devices supported over the substrate structure, the array of optical lensing devices being substantially RF transmissive and being arranged to correspond with the arrangement of the optical units, such that each optical unit may communicate light signals with an associated optical lensing device so as to communicate light signals along an optical axis within the angular scan range of the RF phased array.

As such a common aperture device is provided which combines an RF antenna capability with a Free Space Optical capability whilst tending to minimise the size and weight per unit.

The provision of the array of lensing devices (e.g. a lenslet array) may tend to reduce the range of angles through which an optical beam may be steered, but each lensing device can tend to provide a larger optical aperture and so mitigate the divergence associated with known optical phased arrays. Such mitigation may provide an antenna especially suited to communications over longer distances (e.g. 500-2000 m).

At least one optical unit within the array may be a multi-fibre optical unit comprising a plurality of optical fibres arranged substantially in parallel with each other, and which optical fibres terminate in a plane substantially normal to the optical axis, the plane facing an associated optical lensing device of the array of optical lensing devices.

Further, each multi-fibre optical unit may be interfaced with a phase shifter such that each optical unit may function as an optical phased array.

Still further, there may be provided optical sensors at the terminating plane of the multi-fibre optical unit, and a control unit, the optical sensor and control unit being interfaced with the phase shifter, such that the phase shift may be adjusted to control optical signal transmission or reception.

The antenna may comprise a fill-factor lensing device wherein the fill-factor lensing device is arranged to receive a light signal of first beam width from the multi-fibre optical unit and output a substantially collimated signal of a greater beam width.

Such an array of lensing devices may tend to provide a phased output with a high fill factor and reduced side lobe intensity (when compared to known optical phased arrays). Such reduced side lobe intensity can reduce the opportunity for other parties to eavesdrop or detect the communications.

The antenna may comprise a selectively deflecting lensing device, and an optical signal router, wherein the multi-fibre optical unit is associated with the selectively deflecting lensing device, and wherein the optical signal router may route an optical signal through any of the fibres in the multi-fibre optical unit, such that the inclination of transmitted optical signals, relative to the optical axis, varies according to which fibre within the multi-fibre optical unit the optical signal has been routed through.

Further, the antenna may comprise optical sensors at the terminating plane of the multi-fibre optical unit, and a control unit, the optical sensor and control unit being interfaced with the optical signal router, such that the signal routing may be adjusted to control optical signal transmission or reception.

The antenna may comprise a plurality of identical multi-fibre optical units wherein the phase shifter or optical router arrangement is for driving the plurality of identical multi-fibre optical units in concert.

As such the intensity of the transmitted signal can tend to be increased and/or the sensitivity to incoming signals can be increased. Alternatively, each of the plurality of multi-fibre optical units could be driven independently as desired.

The substrate structure may define voids. In particular, where the antenna is a Vivaldi-type array where the substrate structure comprises a first set of boards and a second set of boards, the first and second sets may be orthogonal and intersecting, and having onto them formed RF units, such that interstices between the boards define the voids.

At least one optical unit may be set into a void defined by the substrate structure.

The array of optical lensing devices may be provided with an actuator for effecting a beam steering operation. In particular, the actuator may comprise a tilt mechanism such that the lens array may vary its inclination relative to the substrate structure, by rotating about a first axis.

Optionally, the actuator may comprise a translation mechanism for shifting the array or lensing devices relative to the planar substrate structure whilst maintaining the given separation.

Such actuators and mechanisms allow an optical beam formed by the optical units to be steered and as such can compensate for the reduction in steerable angle that tends to be introduced by the array of lensing devices.

Each lensing device may comprise an optical sensor and a control unit, interfaced with the actuator and wherein the optical sensor comprises a plurality of sensor tiles adjacent the optical unit.

So that the invention may be well understood, embodiments thereof shall now be described and with respect to the following figures of which.

Figure 1:
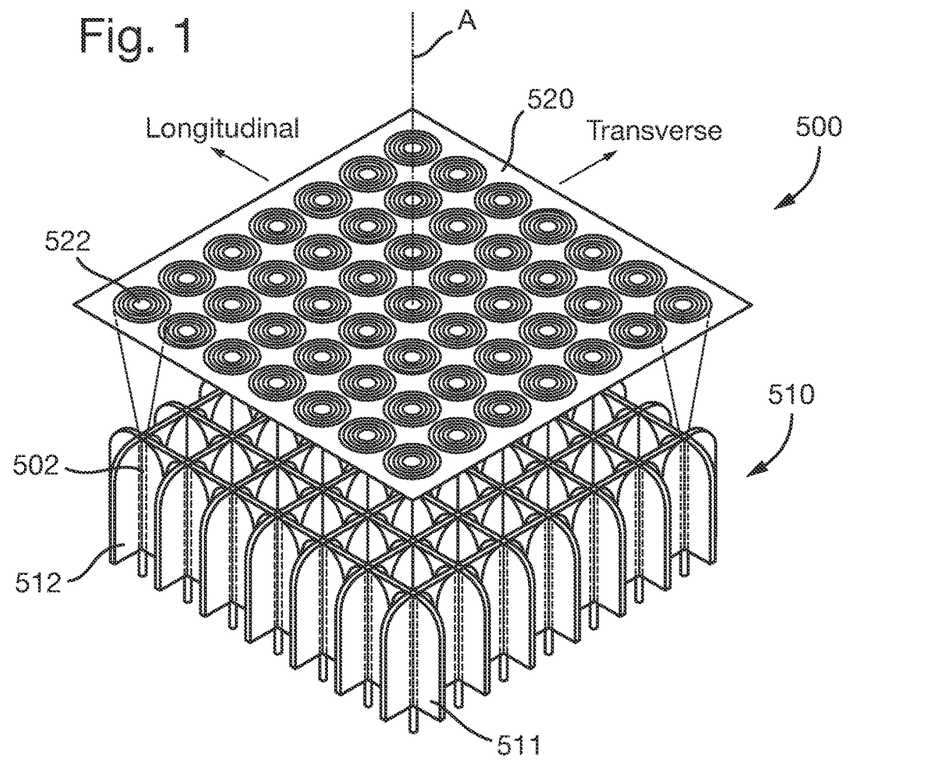
FIG. 1 shows a three-dimensional diagram of an embodiment of a multiband antenna in the form of an integrated optical and RF phased array provided with an array of lensing devices.

An embodiment of a multi-band antenna, referred to generally at 500, is shown in FIG. 1 to comprise an RF phased array 510 integrated with an optical unit array. The RF phased array 510 is in the form of an array of Vivaldi antennas and thereby defines a planar waffle substrate structure and a boresight axis A normal to the planar structure. The optical array is formed from a plurality of regularly spaced optic fibres 502 arranged parallel with boresight axis A.

The Vivaldi phased array structure 510 is generally of the form described in the applicant's application PCT/GB2011/051342 but differs firstly in having an optical fibre 502 mounted at the intersection of each board bearing the Vivaldi elements (for example at the intersection of longitudinal board 511 and transverse board 512). Secondly, there is also provided an array of optical lenslets 520, supported above the RF array 510. The array of lenslets 520 is formed on a substantially RF transparent material and each lenslet 522 is configured to focus incoming optical signals to an associated embedded fibre optic 502.

Further, each fibre optic 502 and associated lenslet 522 is configured such that light emitted from the fibre 502 will propagate towards its specific lenslet 522 within the array 520 whereupon such light will become collimated and propagate onwards (e.g. as a beam parallel to boresight axis A).

In general the lenslet array 520 will be positioned in parallel with the RF array 510 such that the resulting RF boresight (when all of the elements are in phase with one another) is substantially coincident with the optical boresight.

However, the array of lenslets 520 may be provided with an actuator for translation longitudinally, or transversely, whilst maintaining a constant separation between the lenslet array and the Vivaldi array, in order to steer the collimated beams of optical radiation in up to two dimensions.

Alternatively or additionally, each of the optical fibres 502 could be fed through an optical phase shifter (not shown) of sufficient timing precision that the phase difference between each optical fibre 502 could be controlled to effect an optical phased array. Further, each optical fibre 502 at the intersection of the panels 512 making up the Vivaldi array 510 may be substituted for a multi-fibre optical unit having the form of a bundle of fibres (such as bundle 540 shown in FIG. 4) for operation as a phased array.

Figure 2:
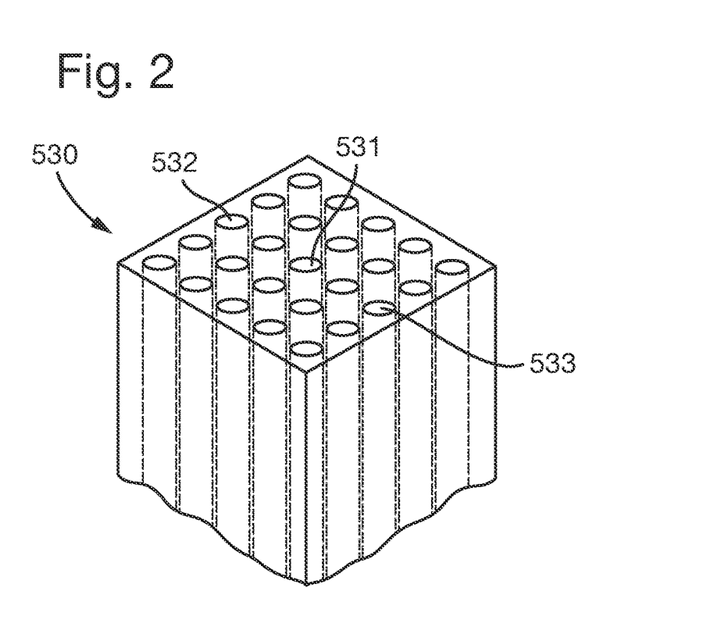
FIG. 2 shows a three-dimensional diagram of a multi-fibre optical unit suitable for use with the embodiment of FIG. 1.

Referring to FIG. 2, in addition to the array of fibres 502, or the bundle of fibres 540, or as an alternative to either, a multi-fibre optical unit having the form of an interstitial array of optical fibres 530 may be provided in a form suited to insertion into the cuboid interstices or voids defined by the Vivaldi antenna structure 510. The interstitial fibre-array 530 has the form of a plurality of parallel optic fibres (e.g. including central fibre 531 and peripheral fibres 532 and 533) spaced apart at regular intervals and terminating in a face plane being normal to the axis of the fibres. These fibres are embedded into a dielectric to achieve a substantially cuboid form, which may be slotted into the cuboid interstices of the substrate structure of the Vivaldi array 510.

As discussed above, the interstitial fibre arrays 530, in conjunction with an array of lensing devices, may operate as a phased array. However alternative modes of operation are contemplated.

Figure 3:
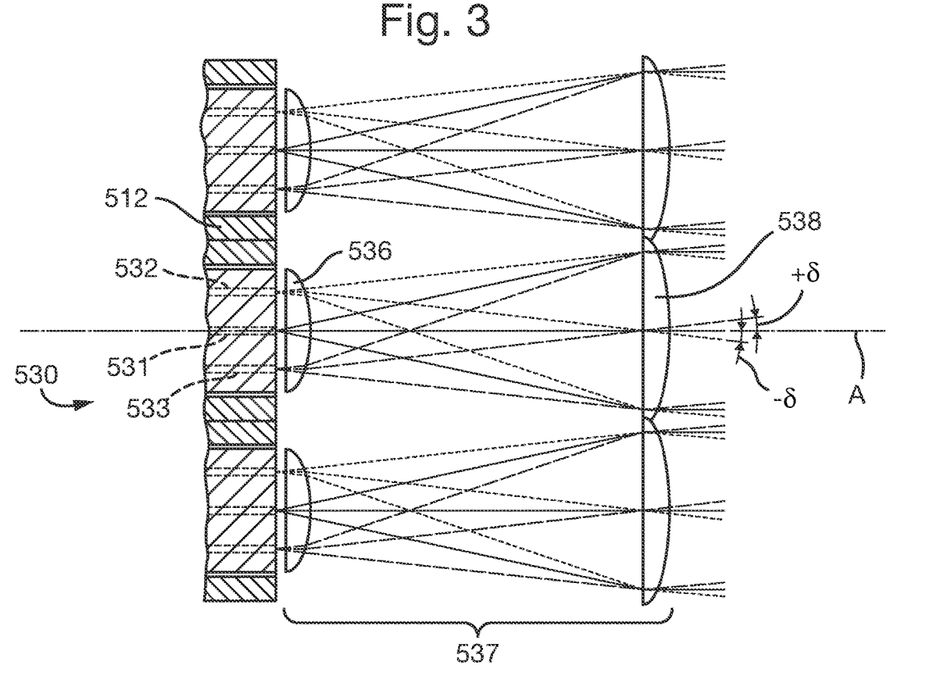
FIG. 3 shows a schematic cross-section through a further multi-band antenna where an array of multi-fibre optical units is integrated with an RF phased array and an array of alternative lensing devices.

In particular, and referring to FIG. 3 where shown inserted into a cuboid interstice of the Vivaldi structure, each fibre array 530, may be driven by an optical router (not shown) where only a selection of the fibres in the array 530 are activated in order to determine beam orientation/deflection. The selection of fibres activated by the router corresponds to a particular area on the face of the array 530. Various selections are possible, each corresponding to a different area on the face of the array 530.

An arrangement for such operation comprises, in addition to the fibre sub-array 530, a selectively deflective lensing device 537 having a first lens 536 (shown in FIG. 3 as a refractive shaped lens) proximate to the face plane of the sub array 350, and a second lens 538 distal to the face plane of the sub array 530.

The first lens 536 is in close proximity to the sub-array 530 such that in operation, the lens 536 acts as a prism where deflection angle δ increases as a function of the distance from the central axis of the multi-fibre optical unit 530. Moreover, the sub-array 530, proximate lens 536 and distal lens 538 are arranged such that light profiles emanating from each of the fibres of the sub-array 530 and propagating through the first lens 536 overlap in the plane of the distal lens 538. The function of the distal lens 538 is to then collimate these emissions whilst maintaining the deflection angle δ generated by the first lens 536 for each fibre position. For this arrangement both lenses 536, 538 possess the same focal length, and each lens is positioned in the focal plane of the other.

With such a configuration, if only the central fibre 531 is activated, the optical signal emitted will follow a predetermined path, illustrated with the solid line in FIG. 3. As such a central fibre signal is emitted from the central fibre 531, and divergently follows the boresight axis A (or an axis parallel thereto) to illuminate the proximate lens 536. Subsequently the central fibre signal is output from the proximate lens 536 along the axis A, continues to diverge until arriving at the distal lens 538. Upon illuminating and passing through the distal lens 538 the central fibre signal becomes collimated and propagates along the axis A. Thus the overall effect of the lensing device is to collimate the light from the central fibre 531 along the boresight axis A.

Conversely, optical signals propagating onto the antenna along the axis A will be focussed onto the central optical fibre 531 by the lensing device 537. Thus by activating only the central optical fibre 531 of the array, signals incoming along axis A may be received.

Furthermore, a plurality of sub-arrays 530 may be provided. As such, each array 530 is set-in to each of the voids of the substrate structure and the sub-arrays 530 may all activate their respective central optical fibres in concert to effect a larger aperture for communications along boresight axis A.

If only the upper distal fibre 532 is activated, then the upper fibre optical signal (shown in a dotted line in FIG. 3) emitted from the fibre 532 propagates divergently along an axis parallel to the boresight axis A until it reaches an upper portion of the proximate lens 536. At the proximate lens 536 the upper optical signal is divergently steered onto the distal lens 538 such that the signal is output from the distal lens 538 as a collimated beam that is inclined by −δ° to the axis A of the sub array 530 (or downwards as shown in FIG. 3).

Conversely, optical signals propagating onto the antenna along an axis inclined by −δ° relative to axis A, will be focussed onto the upper optical fibre 532 by the lensing device 538,536. Thus by activating only the upper optical fibre 532 of the array, signals incoming along axis A−δ° may be received.

Further, where a plurality of arrays 530 are provided, each array 530 may activate their respective upper optical fibre to effect a larger aperture for communications along boresight axis A−δ°.

When only the lower distal fibre 533 is activated, then the lower fibre optical signal (shown in a dashed line in FIG. 3) emitted from the fibre 533 propagates divergently along an axis parallel to the boresight axis A until it reaches a lower portion of the proximate lens 536. At the proximate lens 536 the lower optical signal is divergently steered onto the distal lens 538 such that the signal is output from the distal lens 538 as a collimated beam that is inclined by +δ° to the axis A of the sub array 530 (or upwards as shown in FIG. 3).

Conversely, optical signals propagating onto the antenna along an axis inclined by +δ° relative to axis A, will be focussed onto the lower optical fibre 533 by the lensing device 538,536. Thus by activating only the lower optical fibre 533 of the array, signals incoming along axis A+δ° may be received.

Further, where a plurality of arrays 530 are provided, each array 530 may activate their respective lower optical fibre to effect a larger aperture for communications along boresight axis A+δ°.

As such, by selecting which particular fibre within sub-array 530 is activated (or by selecting a particular fibre in each of a plurality of sub-arrays 530), a predetermined steer can be applied to transmitted light (with receive behaviour being correspondingly affected).

As a whole the optical array (i.e. the array as formed by the many sub-arrays 530 at the interstices of the Vivaldi structure 510) may scan (e.g. from up to down, or from +δ to −δ) by having all of the sub-arrays 530 activate only their upper peripheral fibre 532, then in concert switch to having only the central fibres 531 activated, and finally switching in concert to the lower peripheral fibre 533.

Where a greater number and density of fibres in the sub-array 530 are employed, a finer scan increment can be realised.

The proximate lenses 536, distal lenses 538 and interstitial arrays 530 are formed from materials that are chosen to minimise the effects on the RF signals received and transmitted by the antenna 500. As such, these components should tend to be formed from a substantially RF transparent material and will thus be RF transmissive.

Figure 4:
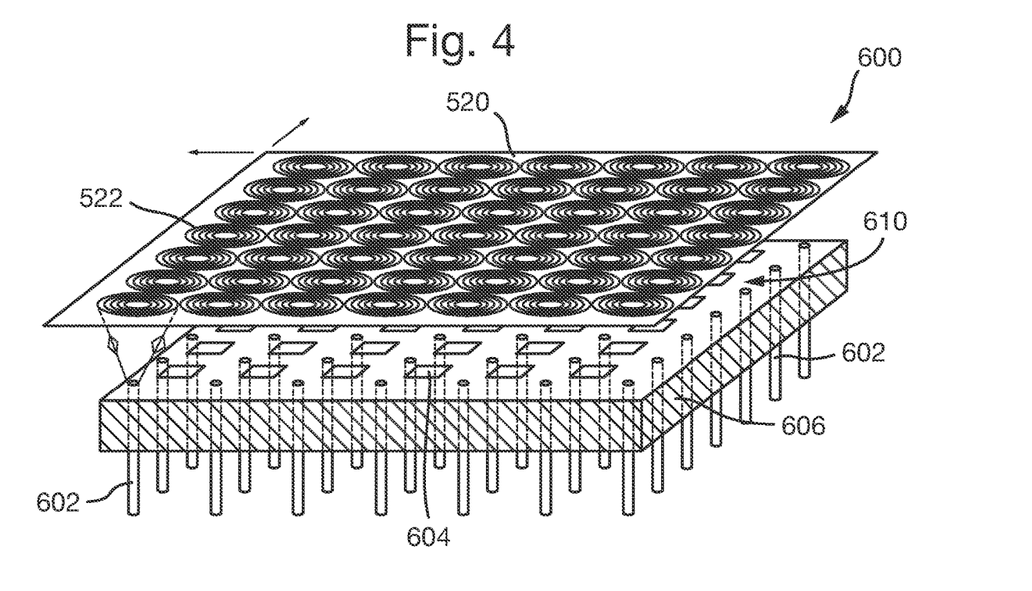
FIG. 4 shows a three-dimensional diagram of a further embodiment of a multiband antenna in the form of an integrated optical and RF phased array, provided with an array of lensing devices.

As an alternative to the embodiment 500, there is shown in FIG. 4 a further embodiment of a multiband antenna, indicated generally at 600, where the RF phased array may be in the form of a patch antenna array 610 where the patch antennas 604 are integrated onto a substrate board 606. Here, the optical fibres 602 for transmitting and receiving optical signals, are arranged at the interstices between the patch antennas 604, and are arranged such that each fibre 602 is located to correspond with a lenslet 522 in the microlens array 520.

As an alternative to the single optic fibre 502, 602 shown in the embodiments of FIG. 1 and FIG. 4 respectively, a multi-fibre optical unit having a bundle 540 of optical fibres may be provided.

Figure 5:
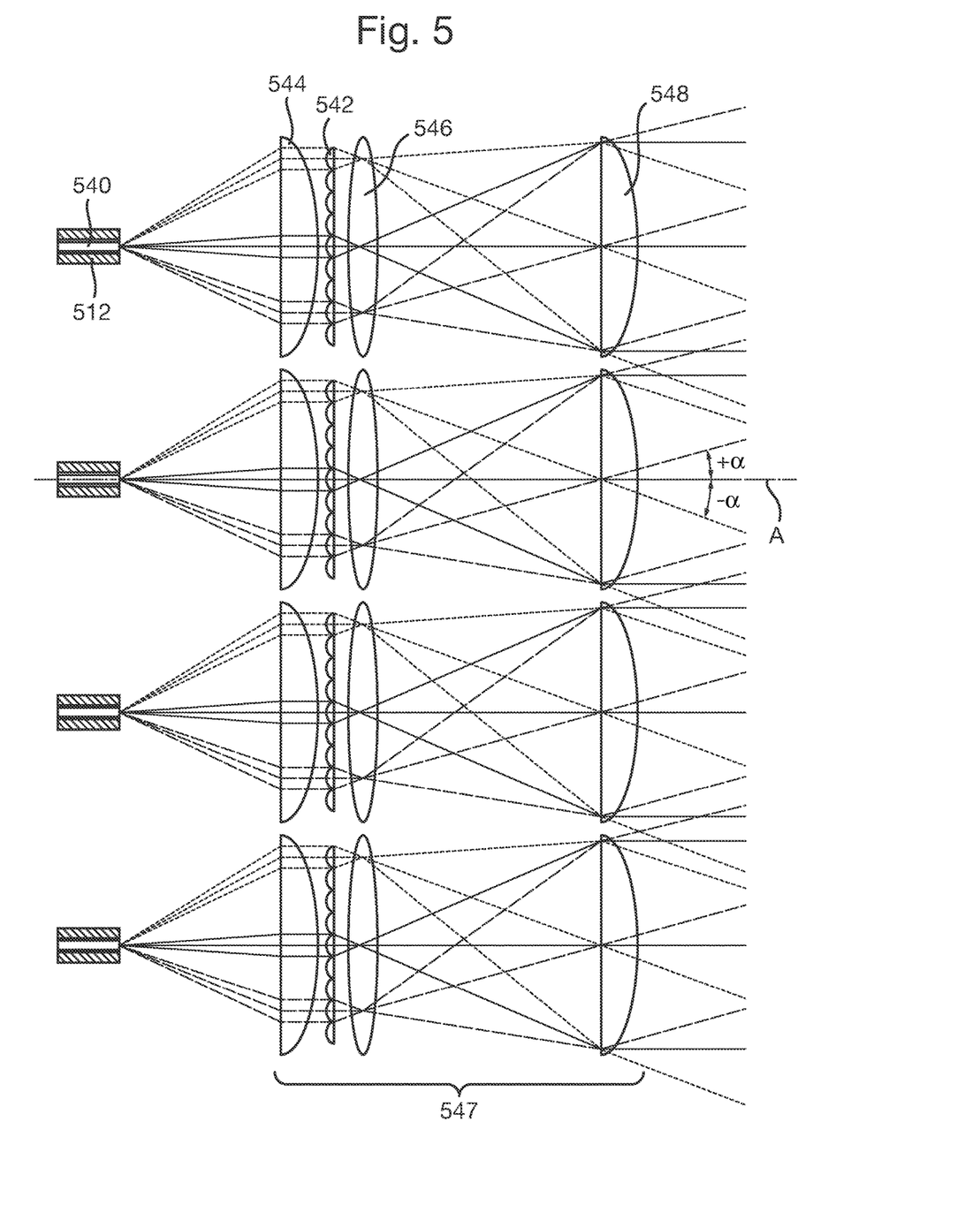
FIG. 5 shows a schematic cross-section through a further multi-band antenna where an array of alternative multi-fibre optical units is integrated with an RF phased array and an array of further alternative lensing devices.

Referring to FIG. 5, each such bundle 540 may be configured to operate as a phased array where the lensing devices act to broaden out the optical aperture.

In the embodiment shown in FIG. 5, respective light signals are fed to each of the optical fibres in the bundle 540 through an optical phase shifter (not shown) of sufficient timing precision that the phase difference between each optical fibre can be controlled to effect an optical phased array capable of changing the phase profile of the output beam and thereby enable fine beam steering.

The particular amount of beam steering achievable will depend on how closely packed the fibres within the multi-fibre unit are. Pitches of e.g. 9 μm and 15 μm can currently be achieved, which should offer fine beam steering of up to ±1° from the main beam axis A. Smaller pitches would tend to provide larger steering angles.

Further, by providing the bundle 540 with a suitable optical lensing device, the characteristics of the beam generated can be adapted (e.g. the amount of steer can be reduced whilst increasing the beam's fill factor and decreasing side-lobe intensity).

In order of proximity to the bundle 540 along the bundle axis, each optical lensing device 547, in the form of a fill factor lensing device, comprises a near collimating lens 544, an array of lenslets 542, a deflecting lens 546 and a far collimating lens 548. The bundle axis is parallel with the boresight axis A.

The near collimating lenses 544, the array of lenslets 542, the directing lens 546 and the far collimating lens 538 are formed from materials that are chosen to minimise the effects on the RF signals received and transmitted by the antenna. As such, these components should tend to be formed from a substantially RF transparent material and will thus be RF transmissive.

In a first mode of operation the bundle 540 and lensing device may direct a beam downwards, or by −α relative to axis A.

As such, the phased array formed by the bundles 540 may initially be driven to direct a narrow divergent beam (shown in a dotted line on FIG. 5) upwards towards an upper portion of the near collimating lens 544. The optical signal becomes collimated as it passes through the lens 544 and propagates, in parallel with the bundle axis, to an upper lenslet within lenslet array 542, which causes the optical signal to converge as it propagates along the bundle axis towards an upper portion of deflecting lens 546.

At deflecting lens 546, the rays of the optical signal are deflected so as to illuminate the entire face of far collimating lens 548.

At far collimating lens 548 the optical signal is collimated such that a wide beam is output which propagates along an axis which is negatively inclined to the bundle axis (i.e. the beam is directed downwards).

In a second mode of operation the bundle 540 and lensing device may direct a beam along the bundle axis or parallel thereto.

As such, the phased array formed by the bundles 540 may initially be driven to direct a narrow divergent beam (shown in a solid line on FIG. 5) along the bundle axis (or parallel thereto) towards the centre of the near collimating lens 544. The optical signal becomes collimated as it passes through the lens 544 and propagates, along the bundle axis, to a central lenslet within lenslet array 542, which causes the optical signal to converge as it propagates along the bundle axis towards deflecting lens 546.

Subsequent to the deflecting lens 546, the rays of the optical signal continue to propagate so as to illuminate the entire face of far collimating lens 548.

At far collimating lens 548 the optical signal is collimated such that a wide beam is output which propagates along the bundle axis.

In a third mode of operation the bundle 540 and lensing device may direct a beam upwards, or by +α relative to axis A.

As such, the phased array formed by the bundles 540 may initially be driven to direct a narrow divergent beam (shown in a dashed line on FIG. 5) downwards towards a lower portion of the near collimating lens 544. The optical signal becomes collimated as it passes through the lens 544 and propagates, in parallel with the bundle axis, to a lower lenslet within lenslet array 542, which causes the optical signal to converge as it propagates along the bundle axis towards deflecting lens 546.

At deflecting lens 546, the rays of the optical signal are deflected to propagate generally upwards and to diverge so as to illuminate the entire face of far collimating lens 548.

At far collimating lens 548 the optical signal is collimated such that a wide beam is output which propagates along an axis which is positively inclined to the bundle axis (i.e. the beam is directed upwards).

There has been described above a bundle 540 based phased array. However an alternative embodiment may provide an optical phased array by suitably driving the interstitial array(s) 530 within the antenna with an optical phase shifter and arranging a suitable lensing device in front of the array. Further enhancements of the steering angle range may be provided by the lensing device.

Alternative forms of antenna could also be used in place of the patch antennas 604. For example, the phased array may be comprised by an array of dipoles.

Figure 6A:
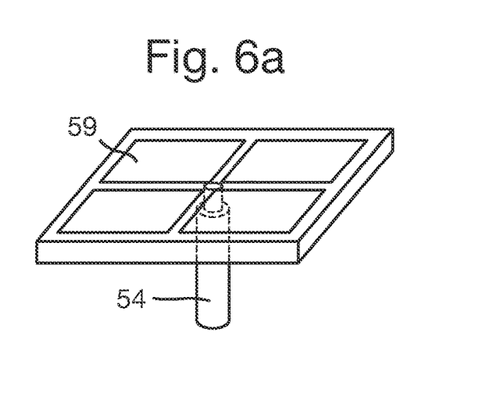
FIG. 6a shows a three-dimensional schematic view of an optical unit for use in the antenna provided with a wavefront sampling sensors.

In embodiments such as those above, an array of sensors 59 may surround or otherwise be adjacent to an optical unit with a fibre or multi-fibres 54, as shown in FIG. 6*a*. The array of sensors 59 can be mounted on a planar substrate surface which is arranged perpendicularly to the beam/fibre axis. The array of sensors 59 may be interfaced with a control unit (not shown) of the lensing device such that the condition of the light signal at the fibre 54 may be fed back to the control unit 58, and the lensing device adapted (e.g. translated) accordingly.

Figure 6B:
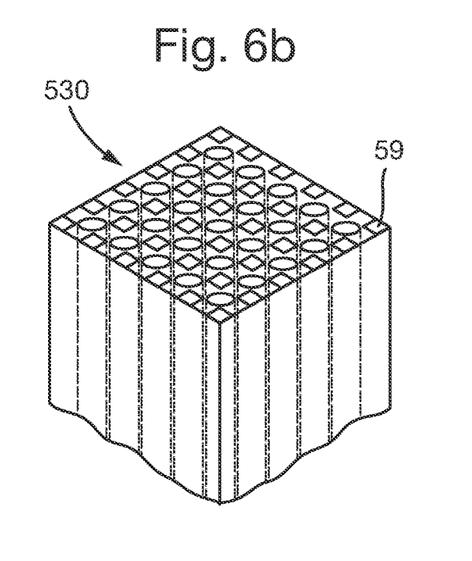
FIG. 6b shows the wavefront sampling sensors of FIG. 6a integrated into the multi-fibre optical unit shown in FIG. 2.
Figure 6C:
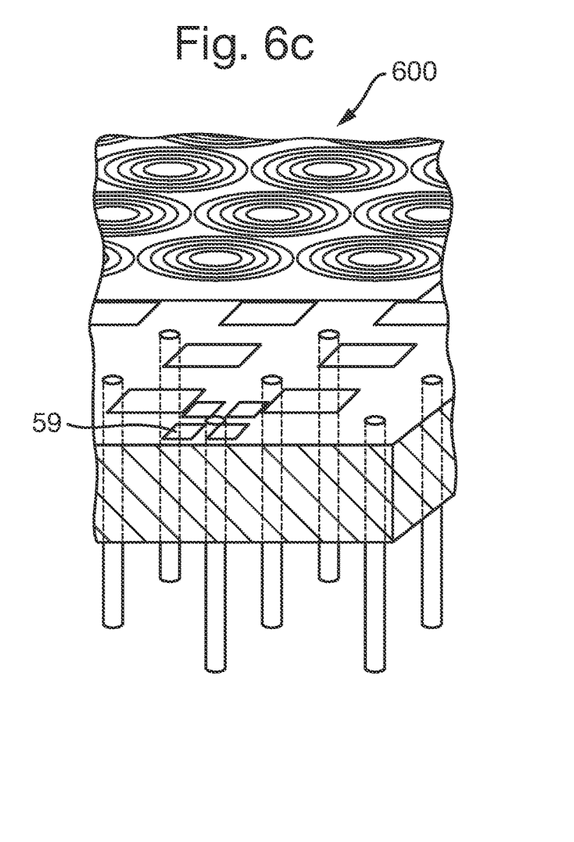
FIG. 6c shows the wavefront sampling sensors of FIG. 6a integrated into the RF phased array of FIG. 4.

FIG. 6*b* shows how such sensors 59 could be physically arranged amongst the fibres at the interstitial sub-array 530. FIG. 6*c* shows how sensors 59 could be physically arranged around the fibres 602 of the patch antenna array 600.

The array of sensors 59 may be generally used as a detector array, in conjunction with a control unit and actuator to optimise or otherwise affect the communication of the optical signals to and from the multi-band antenna.

Thus, in arrangements such as those comprising the interstitial array 530 in FIGS. 2 and 3, the sensors 59 could be operably connected to a control unit and the signal router to identify the selection of fibres in the array to be activated to optimise a given parameter or parameters, such as received signal intensity.

Further, in arrangements such as those comprising the lenslet array 520 of FIGS. 1 and 4, the sensors 59 could be linked to the control of an tip-tilt mechanism to help optimize a given parameter or parameters. However, other forms of actuators may be suitable for controlling the signals at lenslet array 520. For example an actuator for translating the array 520 (i.e. without rotation relative to the substrate structure 510) in a transverse and/or longitudinal direction and/or along boresight axis A direction, may be provided.

Still further, in arrangements such as shown in FIG. 5, the sensors 59 could be linked to the control of a phase shifter in a phased array of phased arrays to offer fine beam correction. The four quad sensors surrounding each (phased) fibre array could be used to determine the optimal localised beam wavefront.

The above embodiments could be suitable for operation in various RF frequency ranges provided that the dimensions of the surface elements are appropriately designed to match any chosen operational frequency. Particular frequency ranges contemplated would be in the 50 GHz to 70 GHz range and more particularly in the region of 60 GHz. However, other embodiments may operate in the super high frequency (3-30 GHz) or extremely high frequency (30-3000 GHz) ranges.

Various lensing devices and structures are contemplated for use with the present invention, provided they are suitably RF transmissive. The skilled man would, upon reading this application, readily understand the alternative lensing devices and structures which could be applied to work the invention in any of the described embodiments. For example, devices understood as being kinoforms, Fresnel lenses, volume holograms, zonal masks etc. could be used to replace or enhance performance of the lenslet arrays and the continuous profile refractive lens arrays described or shown above.

The optical lensing devices should be formed from a material that is transparent to both optical radiation and the RF signal (e.g. millimetric wavelength RF signals), and negligibly distort the RF signal. As such, the lensing devices chosen for use in the present invention are formed from at least one of a group comprising: quartz, poly(methyl methacrylate) (sometimes sold as Perspex), polycarbonate and sapphire. To enable the lens structure to be conveniently modelled, and thus to provide a precisely arranged device, the material chosen from this group should have a well-defined dielectric constant.

Distribution of the optical radiation has been discussed as being achievable using optical fibres. However other light guiding techniques could be used. For instance opto-electronic integrated circuits (also known as photonic integrated circuits) could be used to support optical communications and enable photonic beamsteering of RF phased arrays. Further, light could be routed by slab waveguides within 3D structures to generate a regular emitting array (see 'Reconfigurable Integrated Optoelectronics' to Soref, Advances in OptoElectronics v2011 ID 627802). In addition, the techniques of wavelength dependent beamsteering may be used within the invention (see 'Two-dimensional optical phased array antenna on silicon-on-insulator' to Acoleyen, from Vol 18 No 13 Optics Express). Such waveguide structures could also be added to more conventional PCB board for integration into a Vivaldi array.

The above embodiments have shown antennas for receiving a beam of radiation and/or for transmitting a collimated beam of radiation. In each embodiment the beam has been collimated such that it does not diverge. However in variant embodiments of the present invention, a linear-scan directional antenna may be provided having a beam that is collimated in a first aspect but diverges in a second aspect. For example a beam could be collimated horizontally but diverge vertically so as to permit scanning in the azimuth.

Various embodiment of the invention have been described above with certain features common between embodiments, and certain other feature being uniquely presented in the context of a particular embodiment. However, this is not necessarily intended to limit such a feature to use with a particular embodiment. In general, features from one embodiment may be imported into another embodiment or exchanged for another, without departing from the scope of the invention.

The invention claimed is:

1. A directional multi-band antenna comprising:
   a substrate structure;
   a plurality of radio frequency (RF) units arranged at the substrate structure to provide an RF phased array, the RF phased array having an angular scan range;
   an array of optical units arranged at the substrate structure and interspersed amongst the RF units; and
   an array of optical lensing devices supported over the substrate structure, the array of optical lensing devices being substantially RF transmissive and being arranged to correspond with the arrangement of the optical units, such that each optical unit may communicate light signals with an associated optical lensing device so as to communicate light signals along an optical axis within the angular scan range of the RF phased array,
   wherein the antenna is a Vivaldi-type array where the substrate structure comprises a first set of boards and a second set of boards, the first and second sets being orthogonal and intersecting, and having onto them formed RF units, such that interstices between the boards define voids.

2. The antenna according to claim 1 wherein at least one optical unit within the array of optical units includes a multi-fibre optical unit comprising a plurality of optical fibres arranged substantially in parallel with each other, and which optical fibres terminate in a plane substantially normal to the optical axis, the terminating plane facing an associated optical lensing device of the array of optical lensing devices.

3. The antenna according to claim 2 wherein each multi-fibre optical unit is interfaced with a phase shifter such that each optical unit may function as an optical phased array.

4. The antenna according to claim 3 further comprising an optical sensor at the terminating plane of the multi-fibre optical unit, and a control unit, the optical sensor and control unit being interfaced with the phase shifter, such that the phase shift may be adjusted to control optical signal transmission or reception.

5. The antenna according to claim 3 further comprising a fill-factor lensing device wherein the fill-factor lensing device is arranged to receive a light signal of first beam width from the multi-fibre optical unit and output a substantially collimated signal of a greater beam width.

6. The antenna according to claim 2 further comprising a selectively deflecting lensing device, and an optical signal router, wherein the multi-fibre optical unit is associated with the selectively deflecting lensing device, and wherein the optical signal router is configured to route an optical signal through any of the fibres in the multi-fibre optical unit, such that the inclination of transmitted optical signals, relative to the optical axis, varies according to which fibre within the multi-fibre optical unit the optical signal has been routed through.

7. The antenna according to claim 6 further comprising an optical sensor at the terminating plane of the multi-fibre optical unit, and a control unit, the optical sensor and control unit being interfaced with the optical signal router, such that the signal routing may be adjusted to control optical signal transmission or reception.

8. The antenna according to claim 3 further comprising a plurality of identical multi-fibre optical units wherein the phase shifter is configured to drive the plurality of identical multi-fibre optical units in concert.

9. The antenna according to claim 1 wherein at least one optical unit is set into a void defined by the substrate structure.

10. The antenna according to claim 1 wherein the array of optical lensing devices is provided with an actuator for effecting a beam steering operation.

11. The antenna according to claim 10 wherein the actuator comprises a tilt mechanism such that the array of optical lensing devices may vary its inclination relative to the substrate structure, by rotating about a first axis.

12. The antenna according to claim 10 wherein the actuator comprises a translation mechanism configured to shift the array of optical lensing devices relative to the substrate structure whilst maintaining a given separation between the substrate structure and the array of optical lensing devices.

13. The antenna according to claim 10 wherein each optical lensing device comprises an optical sensor and a control unit, interfaced with the actuator and wherein the optical sensor comprises a plurality of sensor tiles adjacent the optical unit.

14. A directional multi-band antenna comprising:
    a substrate structure;
    a plurality of radio frequency (RF) units arranged at the substrate structure to provide an RF phased array, the RF phased array having an angular scan range;
    an array of optical units arranged at the substrate structure and interspersed amongst the RF units;
    an array of optical lensing devices supported over the substrate structure, the array of optical lensing devices being substantially RF transmissive and being arranged to correspond with the arrangement of the optical units, such that each optical unit may communicate light signals with an associated optical lensing device so as to communicate light signals along an optical axis within the angular scan range of the RF phased array; and
    an actuator configured to move the array of optical lensing devices relative to the substrate structure, for effecting a beam steering operation;
    wherein the antenna is a Vivaldi-type array where the substrate structure comprises a first set of boards and a second set of boards, the first and second sets being orthogonal and intersecting, and having onto them formed RF units, such that interstices between the boards define voids, and wherein at least one optical unit is set into one of the voids.

15. An antenna according to claim 14 wherein at least one optical unit within the array of optical units, is a multi-fibre optical unit comprising a plurality of optical fibres arranged substantially in parallel with each other, and which optical fibres terminate in a plane substantially normal to the optical axis, the terminating plane facing an associated optical lensing device of the array of optical lensing devices, and wherein each multi-fibre optical unit is interfaced with a phase shifter such that each optical unit may function as an optical phased array.

16. An antenna according to claim 15 further comprising a plurality of identical multi-fibre optical units wherein the phase shifter is for driving the plurality of identical multi-fibre optical units in concert.

17. A directional multi-band antenna comprising:
    a substrate structure;

a plurality of radio frequency (RF) units arranged at the substrate structure to provide an RF phased array, the RF phased array having an angular scan range;

an array of optical units arranged at the substrate structure and interspersed amongst the RF units;

an array of optical lensing devices supported over the substrate structure, the array of optical lensing devices being substantially RF transmissive and being arranged to correspond with the arrangement of the optical units, such that each optical unit may communicate light signals with an associated optical lensing device so as to communicate light signals along an optical axis within the angular scan range of the RF phased array; and an actuator configured to move the array of optical lensing devices relative to the substrate structure, for effecting a beam steering operation;

wherein at least one optical unit within the array of optical units, is a multi-fibre optical unit comprising a plurality of optical fibres arranged substantially in parallel with each other, and which optical fibres terminate in a plane substantially normal to the optical axis, the terminating plane facing an associated optical lensing device of the array of optical lensing devices, and wherein each multi-fibre optical unit is interfaced with a phase shifter such that each optical unit may function as an optical phased array.

18. An antenna according to claim 17 further comprising a plurality of identical multi-fibre optical units wherein the phase shifter is for driving the plurality of identical multi-fibre optical units in concert.

* * * * *